United States Patent
McNicol et al.

(10) Patent No.: US 11,457,065 B1
(45) Date of Patent: Sep. 27, 2022

(54) SERVICE FLEET RATE ADJUSTMENT

(71) Applicant: Amazon Technologies, Inc., Seattle, WA (US)

(72) Inventors: Thomas Alexander McNicol, Seattle, WA (US); Fenil Shah, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/033,463

(22) Filed: Sep. 25, 2020

(51) Int. Cl.
| | | |
|---|---|---|
| *H04L 67/1031* | (2022.01) | |
| *H04L 45/02* | (2022.01) | |
| *H04L 67/1036* | (2022.01) | |
| *H04L 67/1008* | (2022.01) | |
| *H04L 67/61* | (2022.01) | |

(52) U.S. Cl.
CPC ........ *H04L 67/1031* (2013.01); *H04L 45/026* (2013.01); *H04L 67/1008* (2013.01); *H04L 67/1036* (2013.01); *H04L 67/61* (2022.05)

(58) Field of Classification Search
CPC ............. H04L 67/1031; H04L 67/1036; H04L 67/322; H04L 67/1008; H04L 45/026
See application file for complete search history.

(56) References Cited

U.S. PATENT DOCUMENTS

| | | | |
|---|---|---|---|
| 7,451,359 B1 * | 11/2008 | Coekaerts | G06F 11/0709 709/223 |
| 7,764,615 B2 * | 7/2010 | Gilfix | H04L 67/125 370/235 |
| 10,069,859 B2 | 9/2018 | Andrews et al. | |
| 10,097,474 B1 | 10/2018 | Kabbani et al. | |
| 2010/0128605 A1 | 5/2010 | Chavan et al. | |

* cited by examiner

*Primary Examiner* — Philip C Lee
(74) *Attorney, Agent, or Firm* — Robert C. Kowert; Kowert, Hood, Munyon, Rankin & Goetzel, P.C.

(57) ABSTRACT

A system for adjusting individual host rate limits based on a fleet-wide service rate limit and a fleet host count. The system includes a fleet of hosts for a service. Individual hosts of the fleet of hosts respectively include application logic, a host rate limiter to limit interactions between the application logic and another service according to a host rate limit for the individual host, and an adaptive rate component. The adaptive rate component updates a host entry in a host table to indicate a current heartbeat timestamp for the individual host. The adaptive rate component retrieves the fleet-wide service rate value and the fleet host count value. The adaptive rate component determines the host rate limit for the individual host based on the fleet-wide service rate value and the fleet host count value. The adaptive rate component provides the host rate limit to the host rate limiter.

20 Claims, 10 Drawing Sheets

| Host Table 202 for service1 | |
|---|---|
| Host ID 204 | Heartbeat Timestamp 206 |
| host1 | 2020-09-01-03-47-34 |
| host2 | 2020-09-01-03-45-01 |
| host3 | 2020-09-01-03-48-52 |
| ... | ... |
| hostN | 2020-09-01-03-51-30 |

| Service Table 210 for service1 | | |
|---|---|---|
| Parameter 212 | Value 214 | Last Update Timestamp 216 |
| FleetHostCount | N | 2020-09-01-03-51-30 |
| FleetServiceRateLimit | 400 | 2020-09-01-01-01-05 |

FIG. 2

SERVICE FLEET RATE ADJUSTMENT

BACKGROUND

Distributed computing systems utilize numerous computing resources in order to provide services from a service provider to clients. The computing resources execute portions of the services such that overall service performance is spread across the computing resources, and consequences such as computational load and heat generation are also spread across the computing resources. Many distributed computing systems provide services to many clients concurrently and require workload management in order to prevent system overload that may lead to unintended behavior or unexpected downtime.

Workload management may also be implemented as part of a service level agreement between the clients and the service provider. The service provider may agree to provide a specified service level to the clients such that a limited level of service is provided rather than a maximum possible level of service at all times. Workload management may be implemented based on limiting throughput or bandwidth of the computing resources utilized for performing the services, such as by limiting processing or transactional rates of the computing resources. The computing resources as a collective group may be limited in performance for a given client. A workload manager may instruct each of the computing resources to perform work at specific rate limits. Alternatively, each of the computing resources may come to a consensus by communicating between the computing resources to determine the rate limits. However, this approach may cause a computational burden on the workload manager or the computing resources each time the rate limit needs to be altered for each of the computing resources.

BRIEF DESCRIPTION OF THE DRAWINGS

FIG. 2 illustrates a table diagram representing a database, according to some embodiments.

Figure 1:
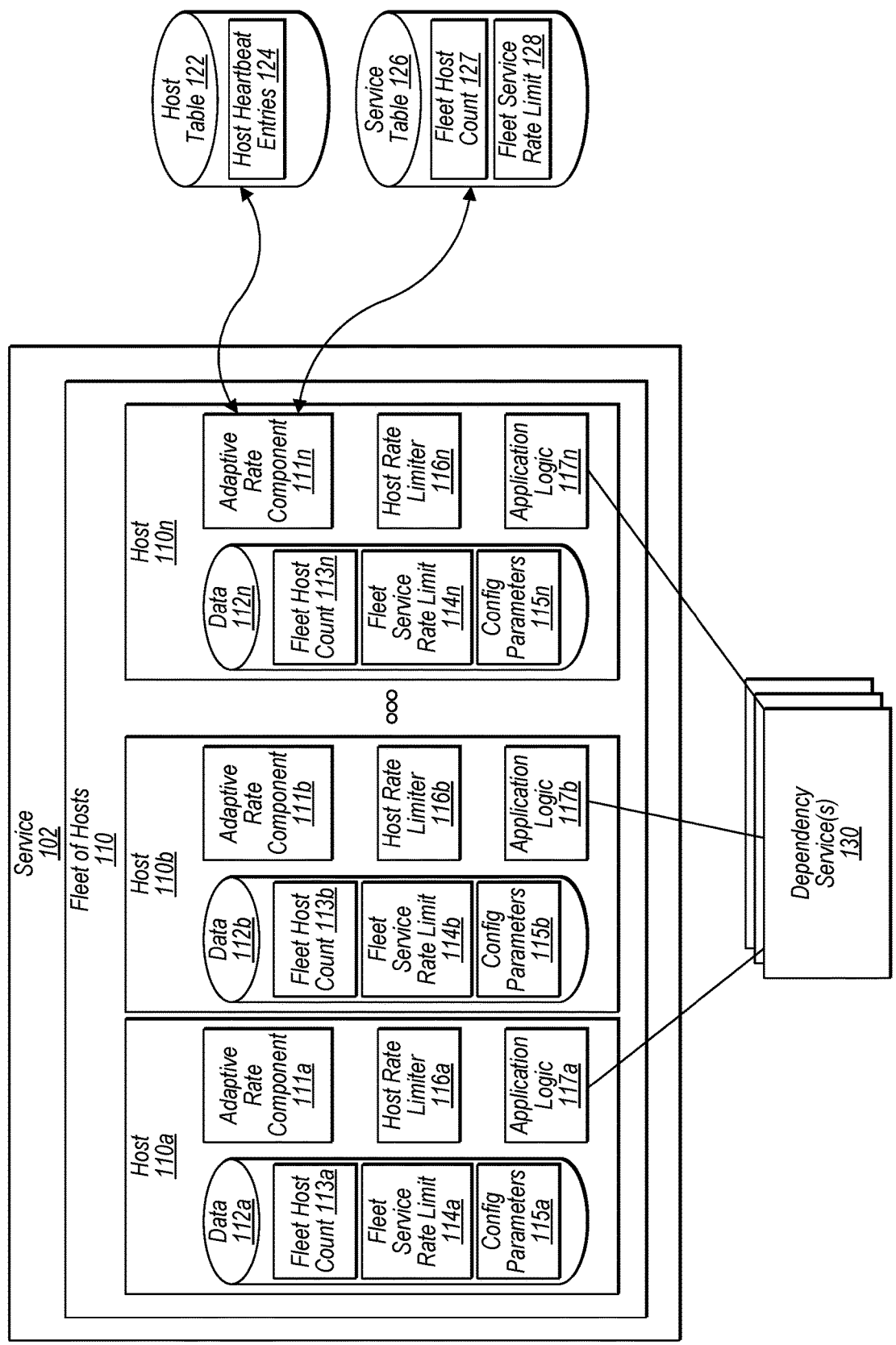
FIG. 1 illustrates a block diagram of a system configured to adaptively adjust rate limits for individual hosts of a server fleet, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for adjustment of a service rate for a server fleet based on a quantity of hosts within the server fleet is disclosed. The service rate may indicate an overall service rate limit that is applied to the server fleet when implementing a particular service of many services or a particular host of many hosts. The service rate limit may indicate how many operations in a particular timeframe or how much bandwidth that the server fleet may utilize to execute the particular service or the particular host. Per-host utilization across each of the hosts of the server fleet may be aggregated or summed in order to determine whether the service rate limit has been exceeded.

Hosts may be added to or removed from the server fleet over time due to various circumstances, such as expiration of a lease on a host or a service level agreement requiring a certain number of hosts be included as part of the server fleet at a given time. The server fleet may be managed using a host table and a server table that stores information indicating the hosts that are in the server fleet and respective rate limits for respective services or respective hosts. When a host is added to the server fleet, the host may send a notification to the host table that indicates that the host is active and has been added to the server fleet. The notification may act as a heartbeat to the host table and may be sent periodically to indicate that the host is active with the server fleet. The host table may register the heartbeat in a database that stores information indicating an identifier for the host, a timestamp for the heartbeat or when the host became active, and an expiration time for the host.

The host may determine a per-host rate limit that may cause the host to reduce or otherwise limit a quantity of actions the host may perform on behalf of the server fleet. The host may reduce computational overhead by calculating the per-host rate limit locally at the host. The host may request that the service table provide a host count record indicating the quantity of hosts in the server fleet and the service rate limit. The service table may provide the host count record and the service rate limit. The host may determine the per-host rate limit based on the quantity of hosts in the server fleet and the service rate limit. In some situations, the per-host rate limit may be based on dividing the service rate limit by the quantity of hosts.

The host may also determine whether the host count record is out-of-date or expired or otherwise potentially inaccurate. The service table may indicate an expiration time parameter for the host count record. Based on the host count record being out-of-date, the host table may provide access to allow the host to query the database to determine the quantity of hosts based on heartbeats that have been registered with the host table. The host may then write to the host count record with an updated quantity of hosts on behalf of the service table. While querying the database, the host may determine whether any hosts registered in the database have expired or have heartbeat timestamps that have not been sufficiently recent, e.g., by not having occurred within a threshold period of time. The host may delete corresponding records for the expired hosts from the database in order to reduce subsequent processing times for subsequent queries of the database.

Individual hosts of the server fleet may also update the per-host rate limit when periodically sending the heartbeat to the host table. The individual hosts may periodically update the per-host rate limit in order to be accurate within a timing threshold for the periodic heartbeat. In other situations, a separate processing thread may determine the host count record such that the individual hosts may receive the host count record as processed by the separate processing thread.

As one skilled in the art will appreciate in light of this disclosure, embodiments may be capable of achieving certain technical advantages, including some or all of the following: reducing computational overhead to make a computer run more efficient, reducing memory requirements, facilitating scalability of server fleets while maintaining per-host rate limits, system-agnostic management of server rate limits, etc.

According to one aspect of the invention, a system is disclosed. The system includes a plurality of computing devices having respective processors and memories to implement a fleet of hosts for a service. Individual hosts of the fleet of hosts respectively include application logic implemented by one or more of the respective processors and memories of the individual host, a host rate limiter implemented by the one or more respective processors and memories of the individual host, the host rate limiter configured to limit interactions between the application logic and another service according to a host rate limit for the individual host, and an adaptive rate component implemented by the respective one or more processors and memories of the individual host. The adaptive rate component is configured to update a host entry in a host table to indicate a current heartbeat timestamp for the individual host. The adaptive rate component is also configured to retrieve, from a data store, a fleet-wide service rate value for the fleet of hosts and a fleet host count value, wherein the fleet-wide service rate value indicates a fleet service rate limit for interactions between the fleet of hosts as a whole and the other service, and wherein the fleet host count value indicates a current count of active hosts in the fleet of hosts determined based on host entries for the fleet of hosts in the host table. The adaptive rate component is further configured to determine the host rate limit for the individual host based on the fleet-wide service rate value and the fleet host count value and provide the host rate limit for the individual host to the host rate limiter.

In another aspect of the invention, a computer-implemented method is disclosed. The method may be performed by a computing device for a host of a fleet of hosts for a first service. The method includes updating, in a host table, a host entry to indicate a current heartbeat timestamp for the host. The method also includes retrieving, from a data store, a fleet-wide service rate value for the fleet and a host count value, wherein the fleet-wide service rate value indicates a service rate limit for interactions between the fleet as a whole and a second service, and wherein the host count value indicates a current count of active hosts in the fleet based on host entries in the host table for the fleet. The method further includes determining an individual host rate limit for the host based on the retrieved fleet-wide service rate value and the retrieved host count value, wherein the individual host rate limit indicates a host rate limit for interactions between the host and the second service. The method also includes providing the individual host rate limit to a host rate limiter for the host.

In yet another aspect of the invention, one or more computer-readable storage media storing instructions are disclosed. The instructions, when executed on or across one or more processors, cause the one or more processors to perform operations. The operations include updating, in a host table, a host entry to indicate a current heartbeat timestamp for a host of a fleet of hosts for a service. The operations also include retrieving, from a data store, a fleet-wide service rate value for the fleet and a host count value, wherein the fleet-wide service rate value indicates a service rate limit for interactions between the fleet as a whole and another service, wherein the host count value indicates a current count of active hosts in the fleet based on host entries in the host table for the fleet. The operations further include determining an individual host rate limit for the host based on the retrieved fleet-wide service rate value and the retrieved host count value, wherein the individual host service rate value indicates a host rate limit for interactions between the host and the other service. The operations also include providing the individual host rate limit to a host rate limiter for the host.

FIG. 1 illustrates a block diagram of a system 100 configured to adaptively adjust rate limits for individual hosts of a server fleet, according to some embodiments. The system 100 includes a service 102 that may include a fleet of hosts 110, a host table 122, a service table 126, and a dependency service 140, according to some embodiments.

The fleet of hosts 110 may be configured to perform one or more functions for the service 102, according to some embodiments. The fleet of hosts 110 may collectively or individually perform the one or more functions in furtherance of the service 102 by delegating or assigning respective tasks to respective ones of the fleet of hosts 110. The fleet of hosts 110 may include hosts 110a, 110b, . . . 110n, where n may be an arbitrary integer indicating that an arbitrary number of hosts may be included as part of the fleet of hosts 110. The fleet of hosts 110 may also be interchangeably referred to as a plurality of hosts, a fleet of computing nodes, a host fleet or a server fleet. The fleet of hosts 110 may be implemented by a plurality of computing resources having respective processors, memories, and other computing hardware. The hosts may also be interchangeably referred to as host nodes, computing nodes, server nodes, or fleet nodes. The fleet of hosts 110 may be configured as part of a distributed system such that individual hosts 110a, 110b, . . . 110n of the fleet of hosts 110 may be geographically located in one facility or across multiple facilities in one or more geographic locations.

The hosts 110a, 110b, . . . 110n may be respectively configured to execute program instructions in order to facilitate the one or more functions of the service 104. In some embodiments, a given host of the hosts 110a, 110b, . . . 110n may be configured to implement the one or more functions on the given host such that the one or more functions are implemented locally at or on the given host. For example, the given host may include one or more processors and a memory that stores program instructions that, when executed on or across the one or more processors, cause the one or more processors to implement the one or more functions. In other embodiments, a given host of the hosts 110a, 110b, . . . 110n may be configured to implement a service call to one or more dependency services 130. For example, the given host may send a service request to the one or more dependency services 130 in order to fulfill the service call in situations where the one or more dependency services 130 perform specialized tasks for which the given host is not configured or insufficiently configured to perform.

The fleet of hosts 110 may be configured to adhere to a service rate limit when fulfilling the service 104, according to some embodiments. For example, the fleet of hosts 110 may be subject to the service rate limit in order to prevent overloading of the fleet of hosts 110 or other components of the provider network 160. In some embodiments, the fleet of hosts 110 may be subject to the service rate limit such that an aggregate sum of individual rates for individual hosts 110a, 110b, . . . 110n. For example, the individual rates for the individual hosts 110a, 110b, . . . 100n may be summed such that the service rate limit is respected by the fleet of hosts 110 as a collective unit. In some embodiments, the individual hosts 110a, 110b, . . . 110n may have respective host rate limits that restrict the individual hosts 110a, 110b, . . . 110n from performing various functions in excess of the host rate limits.

Hosts may join or leave the fleet of hosts 110 may being activated, deactivated, enabled, disabled, provisioned, deprovisioned, or otherwise added or removed from the fleet of hosts 110, according to some embodiments. For example, hosts may be rotated to and from the fleet of hosts 110 in order to distribute workloads such that the hosts are reallocated to one or more other groups of hosts when demand for another group of hosts is increased or decreased.

As an illustrative example and for the purpose of discussion, host 110n may be a host added to the fleet of hosts 110. The host 110n may be added to the fleet of hosts 110 in response to a change in resource requirements or service requirements that cause additional hosts to be added to the fleet of hosts 110. For example, the host 110n may be added in response to expansion of a service level agreement with a client, a periodic cycling of hosts, or on-demand increases in performance requirements. The host 110n may be subject to rate limits such as the service rate limit across the fleet of hosts 110 or per-host rate limits, according to some embodiments.

The host table 122 may be configured to maintain information regarding the fleet of hosts 110, such as storing information relating to host identifiers, connection timestamps, expiration times, or heartbeat information for the hosts, according to some embodiments. In some embodiments, the information may be maintained as host heartbeat entries 124. For example, the host heartbeat entries 124 may include information received by respective hosts of the fleet of hosts 110 as part of a heartbeat sent by the respective hosts. In some embodiments, a service table 126 may store information, such as a fleet host count 127, fleet service rate limits 128, and a last update timestamp for the service 102 implemented by the hosts 110, according to some embodiments. The fleet host count 127 may alternatively be referred to as a host count value or a fleet host count value. The fleet service rate limit 128 may alternatively be referred to as a fleet-wide service rate value, a fleet service rate value, or a fleet-wide service rate limit. In some embodiments, the service table 126 may be stored as part of the host table 122 as additional fields. For example, the service table 126 may be included as part of the host table 122 as a row in the host table 122 that has data entries in columns that indicate the fleet host count 127 and the fleet service rate limit 128. In other words, the host table 122 and the service table 126 may be included as part of the same database table.

The host 110n may include an adaptive rate component 111n configured to provide heartbeats and/or determine the host rate limit for the host 110n, according to some embodiments. The adaptive rate component 111n may be included as part of application logic 117n, according to some embodiments. In other embodiments, the adaptive rate component 111n may be a separate daemon process. In alternative embodiments, the adaptive rate component 111n may be a library called by the application logic 117n.

On startup or initialization, an adaptive rate component 111n of the host 110n may perform a heartbeat, send a heartbeat, a notification or a connection request to the host table 122, according to some embodiments. For example, the adaptive rate component 111n may perform the heartbeat to the host table 122, as part of an onboarding process, indicating that the host 110n is requesting to be added to or join the fleet of hosts 110 in order to perform the service 104 implemented by the fleet of hosts 110. In some embodiments, the heartbeat may include connection information provided by the adaptive rate component 111n. For example, the connection information may indicate an identifier for the host 110n. As another example, the connection information may indicate a current timestamp representing a point-in-time when the host 110n performed the heartbeat. In some embodiments, the timestamp may be indicated in a human-readable format, such as YYYY-MM-DD-H-M-S or 2020-09-01-12-24-45. In other embodiments, the timestamp may be indicated in epoch time format, e.g., 1598963085. As another example, the timestamp may be indicated in a monotonically increasing counter.

The host table 122 may receive the heartbeat with the connection information, according to some embodiments. The host table 122 may store host heartbeat entries 124 based on the connection information received from respective ones of the fleet of hosts 110. For example, the host table 122 may be configured to receive heartbeats from hosts that are activated to join the fleet of hosts 110. The hosts may add or modify a data entry in the host table 122 as part of a heartbeat operation. As another example, the host table 122 may be configured to listen for incoming notifications from hosts that are to be deactivated or removed from the fleet of hosts 110 or the host table 122.

The host heartbeat entries 124 may include information for the fleet of hosts 110. In some embodiments, a host identifier for the host 110n may be a unique identification number or name such that the host identifier for the host 110n is unique with respect to all other hosts of the fleet of hosts 110. For example, the host identifier may include multiple pieces of information that result in a unique identification name, such as a combination of region, location, facility name, or deployment number. In some embodiments, the multiple pieces of information may be concatenated to form a single data entry. In other embodiments, the multiple pieces of information may be stored in different columns of the database for a given host. In yet other embodiments, the multiple pieces of information may be processed through a hash algorithm, such as a Secure Hash Algorithm or a message digest algorithm, to generate the unique identification number.

The adaptive rate component 111n may store its host identifier to the host table 122 as a data entry. In some embodiments, the data entry may correspond to a row in the host table 122 dedicated to the host 110n. In other embodiments, the data entry may be appended to an existing data block for the fleet of hosts 110. The data entry in the host table 122 may also include a timestamp indicating a point-in-time when the adaptive rate component 111n performed the heartbeat operation or when the host 110n was activated. In some embodiments, the host table 122 may also store an indication of an expiration time for the host 110n. The expiration time for the host 110n may indicate a point-in-time when the host 110n is no longer authorized to perform functions on behalf of the service 104. Alternatively, the expiration time for the host 110n may act as an inactivity timeout window such that the host 110n is required to perform another heartbeat prior to the expiration time or be removed from the fleet of hosts 110 in the host table 122 by another host. In some embodiments, the expiration time may be determined based on the timestamp for when the adaptive rate component 111n performed the heartbeat, as described above. In other embodiments, the expiration time may be determined based on configuration parameters 115n as applied by the host 110n.

A service table 126 may be configured to store information relating to the service 104, according to some embodiments. The service table 126 may include information that indicates a service identifier, a fleet host count 127, and a service rate limit 128. In some embodiments, the service table 126 may be included as part of the host table 122. In other embodiments, the service table 126 may be stored separately from the host table 122. A service identifier for the service 104 may be stored in the service table 126 in order to record data entries keyed for the service 104. The fleet host count 127 may indicate a number or a quantity of hosts that are deployed or implemented for the service 104. The fleet service rate limit 128 may indicate that a service is permitted to perform a certain number of data transactions within a certain time period. In some embodiments, the fleet service rate limit 128 may include multiple service rate limits that are applied toward specific dependency services 130. For example, a first dependency service may have a first service rate limit, and a second dependency service may have a second service rate limit, where the first service rate limit is different from the second service rate limit. The count expiration time 129 may indicate a point-in-time at which the resource counts 127 may be considered out-of-date or requiring an update or refresh.

The adaptive rate component 111n may fetch or retrieve the fleet host count 127 and the fleet service rate limit 128 for the service 104 from the service table 126, according to some embodiments. In some embodiments, the adaptive rate component 111n may read, scan, or query the service table 126 based on the service identifier for the service 104 implemented by the host 110n. For example, the adaptive rate component 111n may query the service table 126 for the fleet host count 127 and the fleet service rate limit 128, corresponding to the service 104. The adaptive rate component 111n may store the fleet host count 127 to data 112n as fleet host count 113n. The adaptive rate component 111n may store the fleet service rate limit 128 to data 112n as fleet service rate limit 114n.

The adaptive rate component 111n may determine a host rate limit to be applied to subsequent operations performed by application logic 117n of the host 110n pursuant to the service 104, according to some embodiments. The host rate limit may be determined based on the fleet host count 127 and the fleet service rate limit 128. In some embodiments, the host rate limit may be determined based on the fleet service rate limit 128 divided by the fleet host count 127. As an illustrative example, suppose for a given service, the fleet host count 127 is 10 hosts, and the fleet service rate limit 128 is 200 messages. The host rate limit may be determined based on dividing 200 messages by 10 hosts to be 20 messages per host. In other embodiments, the host rate limit may be determined based on weighting the fleet host count 127 depending on host configurations or demands. Other embodiments may include determining the host rate limit based on other calculation methods. The determined host rate limit for the host 110n may be provided to the host rate limiter 116n.

The processes to determine host rate limits may be performed by individual hosts of the fleet of hosts 110, according to some embodiments. Individual hosts may determine host rate limits independently of other hosts of the fleet of hosts 110. By determining the host rate limits independently, the individual hosts do not necessarily need to communicate with other hosts to come to a consensus for the per-host rate limits thereby reducing computational costs in requiring the hosts to communicate with each other regarding rate limits. For example, adaptive rate component 111n may determine the host rate limit 113n asynchronously from host 110b determining the host rate limit 113b. In some situations, a difference in determination times for the host rate limit 113n and the host rate limit 113b may cause a discrepancy between values of the host rate limit 113n and the host rate limit 113b. For example, at a first point-in-time when the host rate limit 113n is determined, the fleet host count 127 may be lower than at a second point-in-time when the host rate limit 113b is determined. Despite a potential reduction in precision of the respective host rate limits in the short term, increasing the quantity of hosts in the fleet of hosts 110 over a period of time will allow for minimal discrepancies during subsequent queries to the fleet host count 127 thereby facilitating consistency over longer periods of time or increased fleet sizes.

The fleet of hosts 110 may repeatedly determine the host rate limits over periods of time while performing the service 104, according to some embodiments. For example, the individual hosts may periodically or repeatedly query the service table 126 in order to maintain or update the host rate limits to ensure that the fleet of hosts 110 do not exceed the fleet service rate limit 128.

The service table 126 may also include data or metadata for a last host count update timestamp that indicates a point-in-time when the fleet host count 127 was last updated and is consequently considered expired or out-of-date, according to some embodiments. The last host count update may indicate to a host, such as the host 110n, that the adaptive rate component 111n is to count the quantity of hosts in fleet of hosts 110. In some embodiments, the adaptive rate component 111n may determine the quantity of hosts in fleet of hosts 110 based on scanning the host table 122 to identify which hosts of the fleet of hosts 110 are actively performing the service 104 that the host 110n is performing. In other embodiments, a separate, dedicated resource may be configured to count the fleet of hosts 110 on demand or periodically. In other embodiments, the adaptive rate component 111n may poll the fleet of hosts 110 directly. However, scanning the host table 123 may result in faster processing times to improve the overall function of the adaptive rate component 111n and the service 104.

While scanning the host table 122 to identify the fleet of hosts 110, the adaptive rate component 111n may determine whether there are any expired host entries based on one or more of respective timestamps indicated in the host heartbeat entries 124 and a host expiration time indicated by the configuration parameters 115n, according to some embodiments. For example, the host expiration time may indicate a period of time that is to be added to the timestamps such that if the period of time has elapsed between the timestamp and the current time, the host may be deemed to be expired. The corresponding host entry for the expired host may be removed from the host heartbeat entries 124 in the host table 122.

The adaptive rate component 111n may provide the determined host rate limit to host rate limiter 116n, according to some embodiments. The host rate limiter 116n may apply the host rate limit such that application logic 117n may be limited to a number of messages or jobs that are processed consistent with the host rate limit. For example, the application logic 117n may be limited by the host rate limit to send messages or jobs to the dependency services 130 in order to prevent the dependency services 130 from being overloaded by exceeding the fleet service rate limit 128. As another example, the application logic 117n may be limited by the host rate limit to receive messages or jobs from the dependency services 130 in order to prevent another one of the dependency services 130 from being overloaded by exceeding the fleet service rate limit 128.

FIG. 2 illustrates a table diagram representing a database 200, according to some embodiments. Although the database 200 is depicted as having rows and columns in FIG. 2, the appearance, structure, and readability of the database 200 is for illustrative purposes. The database 200 may be stored at a data store in any suitable format for processing, computer-readability, and data integrity, according to various embodiments. In some embodiments, portions of the database 200 may be stored on multiple, separate systems or at different locations. In other embodiments, the database 200 may be stored in a single storage location or as part of one storage service.

The database 200 may have multiple tables configured to store different types of information, according to some embodiments. The database 200 may include a host table 202 for a service identified as service1. Service1 may correspond to the service 104 of FIG. 1. The host table 202 may include columns representing data for a host identifier (ID) 204, a service identifier (ID) 204 and a heartbeat timestamp 206 for respective hosts. Rows of the host table 202 may correspond to respective hosts of a fleet of hosts, such as the fleet of hosts 110 of FIG. 1, according to some embodiments.

As an illustrative example depicted in FIG. 2, the fleet of hosts may include host1, host2, host3, . . . and hostN. In some embodiments, the host IDs 204 for the fleet of hosts may be human-readable and derived from information that suggests descriptive information regarding the host. In other embodiments, the host IDs 204 may be derived from one or more pieces of information that indicate location and number for the hosts. For example, eastRes1 may suggest that the host is located in an eastern region and is the first resource in that region. In other embodiments, the host ID may be a unique identification number that does not necessarily suggest descriptive information. For example, the host ID may be derived from a serial number or a MAC address or other unique codes. In some situations, the host ID may be derived based on a hash algorithm, such as a Secure Hash Algorithm or a message digest algorithm, to generate the unique identification number to be used as the host ID.

On startup or initialization, a host may send a notification, a heartbeat, or a connection request to the host table 202, according to some embodiments. For example, the host may send the heartbeat to the host table 202 indicating that the host is requesting to be added to or join the fleet of hosts in order to perform the service performed by the fleet of hosts. In some embodiments, the heartbeat may include connection information provided by the host. For example, the connection information may indicate an identifier for the host. In some embodiments, an indicated identifier may be stored in addition to an assigned identifier in order to maintain multiple tracking methods of the hosts.

The host table 202 may include information pertaining to one service of many services such that multiple host tables are stored to represent respective services. In some situations, separation of the host tables may improve computational efficiency in scanning data from the host tables because data relating to other host tables not being included in scans of the host table 202.

The host table 202 may also include a column indicating a heartbeat timestamp 206 for respective hosts, according to some embodiments. Data entries under the column for the heartbeat timestamp 206 may indicate a point-in-time when the host indicated to the host table 202 that the host was provisioned to join a fleet of hosts for a particular service. For example, the host may send a notification or a heartbeat to the host table 202 indicating that the host is requesting to be added to or join the fleet of hosts in order to perform the one or more services performed by the fleet of hosts. In some embodiments, the heartbeat may include connection information provided by the host. For example, the connection information may indicate a timestamp representing a point-in-time when the host sent the notification. In some embodiments, the timestamp may be indicated in a human-readable format, such as YYYY-MM-DD-H-M-S or 2020-09-01-12-24-45. In other embodiments, the timestamp may be indicated in epoch time format, e.g., 1598963085. As another example, the timestamp may be indicated in a monotonically increasing counter.

As an illustrative example and for the purposes of discussion, a host with a host ID 204 of hostN is depicted as a most recently added host. Under the timestamp 206 column, the timestamp for hostN is 2020-09-01-03-51-30. HostN may send a heartbeat that includes connection information to the host table 202. The host table 202 may store portions of the connection information to the host table 202 under the columns for the host ID 204 and the heartbeat timestamp 206, as described above.

The database 200 may also include a service table 210 for service1, according to some embodiments. The service table 210 may include columns representing data for a parameter 212, a value 214 for the parameter, and a last update timestamp 216, according to some embodiments. Rows of the service table 210 may correspond to respective parameters of for the service offered by the provider network, such as the service 104 of FIG. 1, according to some embodiments.

The service table 210 may include a column indicating a parameter 212, according to some embodiments. For example, entries under the parameter 212 column indicate data used in performing functions relating to the service. A FleetHostCount parameter may correspond to a quantity of hosts in a fleet of hosts. The value 214 may indicate respective values for the parameters. For example, the value 214 of N for the FleetHostCount parameter indicates that there are N hosts in the fleet of hosts for service1.

A FleetServiceRateLimit parameter may indicate that the fleet of hosts in the service is permitted to perform a certain number of data transactions within a certain time period. For example, the value 214 for the FleetServiceRateLimit parameter may be expressed in units of messages per second. As another example, the value 214 for the FleetServiceRateLimit parameter may be expressed in units of operations per millisecond. Other units of measurement may also be suitable for expressing the service rate limit. In some embodiments, the FleetServiceRateLimit may have multiple parameters indicating respective service rate limits for various dependency services. For example, multiple entries may represent FleetServiceRateLimitDependency1 or FleetServiceRateLimitDependency2, such that various dependency services may have different service rate limits stored in the service table 210.

In some embodiments, the FleetServiceRateLimit may be divided by the FleetHostCount to determine a host rate limit per host. In other embodiments, the host rate limit may be dynamically allocated and adjusted according to service requirements.

The service table 210 may include a last update timestamp 216 for each of the parameters 212, according to some embodiments. The last update timestamp 216 may indicate a last time when the FleetHostCount parameter was updated.

Expanding on the previous illustrative example, hostN may retrieve information regarding service1 in order to determine the host rate limit that is to be applied by hostN while performing tasks for service1. In some embodiments, hostN may obtain the fleet host count and the fleet service rate limit for service1 to determine the per-host rate limit locally at the hostN. For example, hostN may retrieve the value 214 for the FleetHostCount and the FleetServiceRateLimit from the service table 210. HostN may include access libraries configured to access and query the service table 210 for any requested information. In some embodiments, hostN may determine the per-host rate limit based on the FleetHostCount (e.g., integer value N) and the FleetServiceRateLimit (e.g., 400 messages) values for service1. For example, hostN may calculate 400 messages divided by X resources to determine the per-host rate limit as being 400/X messages per resource. In some embodiments, hostN may store an indication of the determined per-host rate limit to a cache or memory of the hostN in order to limit the rate in which hostN performs operations or sends messages on behalf of service1.

Figure 3:
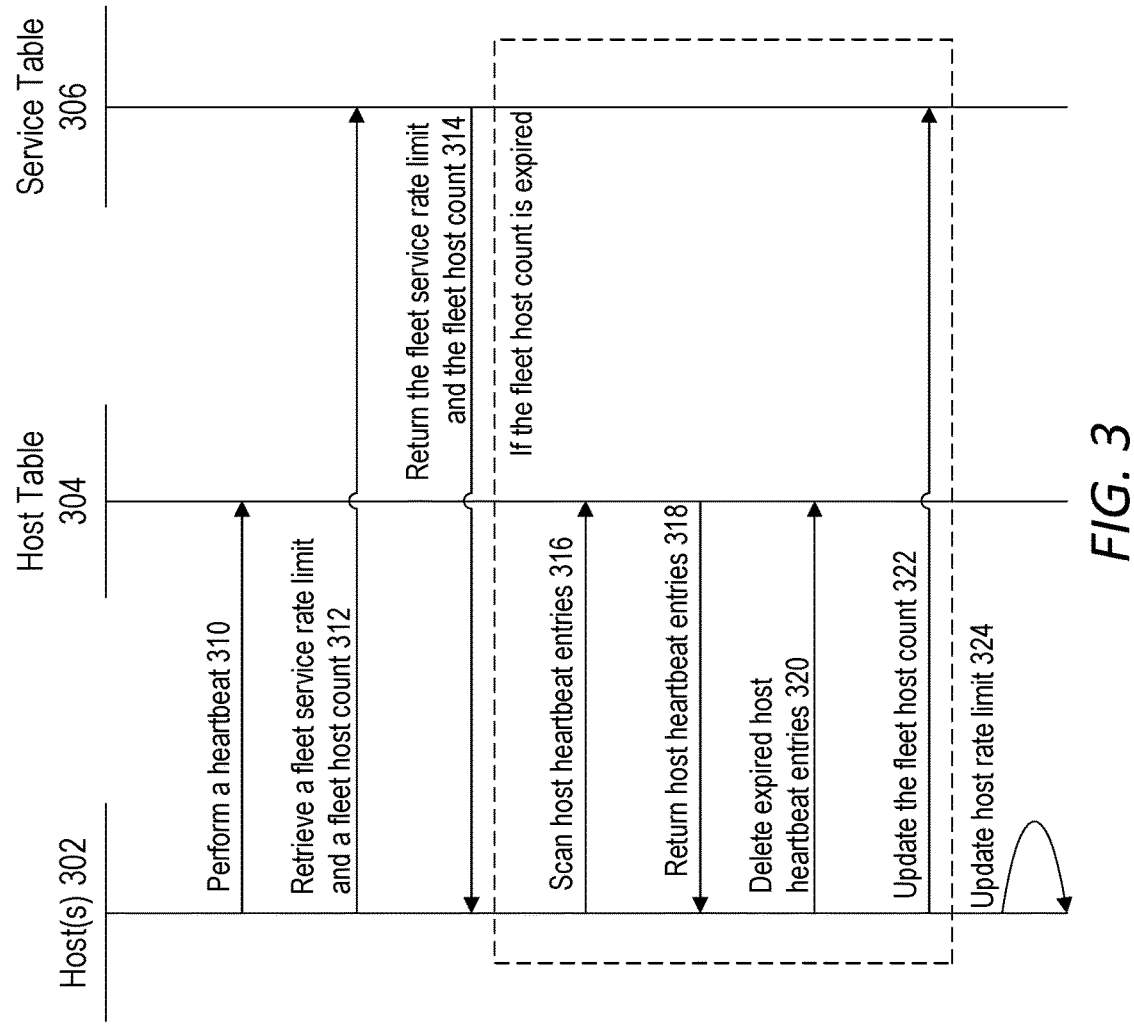
FIG. 3 illustrates a timeline diagram depicting interactions between one or more hosts, a host table, and a service table, according to some embodiments.

FIG. 3 illustrates a timeline diagram 300 depicting interactions between one or more hosts 302, a host table 304, and a service table 306, according to some embodiments. The hosts 302 may correspond to the hosts 110a, 110b, . . . 110n of FIG. 1. The host table 304 may correspond to the host table 122 of FIG. 1 or the host table 202 of FIG. 2. The service table 306 may correspond to the service table 126 of FIG. 1 or the service table 210 of FIG. 2.

The host 302 may be configured to perform a heartbeat, at 310. The heartbeat 310 may be sent to the host table 304. The host table 304 may record the heartbeat from the host 302 as part of host heartbeat entries, such as host heartbeat entries 124 of FIG. 1. The host 302 may include an adaptive rate component configured to perform the heartbeat, according to some embodiments. The adaptive rate component may correspond to the adaptive rate component 111a, 111b, . . . 111n of respective hosts 110a, 110b, . . . 110n.

The host 302 may also be configured to retrieve a fleet service rate limit and a fleet host count from the service table 306, at 312. In some embodiments, the adaptive rate component may query the service table 306 to retrieve the fleet service rate limit and the fleet host count. In other embodiments, the adaptive rate component may send a request to the service table 306 to obtain the fleet service rate limit and the fleet host count. The service table 306 may return the fleet service rate limit and the fleet host count, at 314.

The host 302 may also determine whether the fleet host count is expired, according to some embodiments. For example, the service table 306 may indicate a last host count update timestamp that indicates a last time when the fleet host count was updated at the service table 306. Based on the last host count update timestamp, the host 302 may determine that the fleet host count is expired.

Based on the determination that the fleet host count is expired, the host 302 may scan host heartbeat entries in the host table 304, at 316. The host entries may be included as part of the host heartbeat entries 124 of FIG. 1 or as rows in the host table 202 of FIG. 2. The host table 304 may return the host heartbeat entries to the host 302, at 318. The adaptive rate component of the host 302 may be configured to iteratively traverse the host heartbeat entries to scan the host heartbeat entries from the host table 304. The adaptive rate component may be configured to determine which, if any, of the host heartbeat entries are expired based on respective timestamps and a configuration parameter indicating an expiration time period to be applied to the timestamps.

The host 302 may be configured to delete the expired host heartbeat entries from the host table 304, at 320. The adaptive rate component may maintain a count of unexpired host heartbeat entries in order to track a quantity of the unexpired host heartbeat entries. The host 302 may be configured to update the fleet host count at the service table 306, at 322. The adaptive rate component may update the fleet host count with the count of unexpired host heartbeat entries, according to some embodiments.

The host 302 may update a host rate limit, at 324. In some embodiments, the adaptive rate component may determine the host rate limit based on the fleet service rate limit and the fleet host count retrieved from the host table 304. In other embodiments, the adaptive rate component may determine the host rate limit based on the fleet service rate limit and the fleet host count cached at the host 302. The adaptive rate component may determine the host rate limit based on the fleet service rate limit divided by the fleet host count.

The process illustrated in FIG. 3 may be performed by any number of individual hosts of the fleet of hosts in order to manage and update respective host rate limits at each of the hosts.

Figure 4:
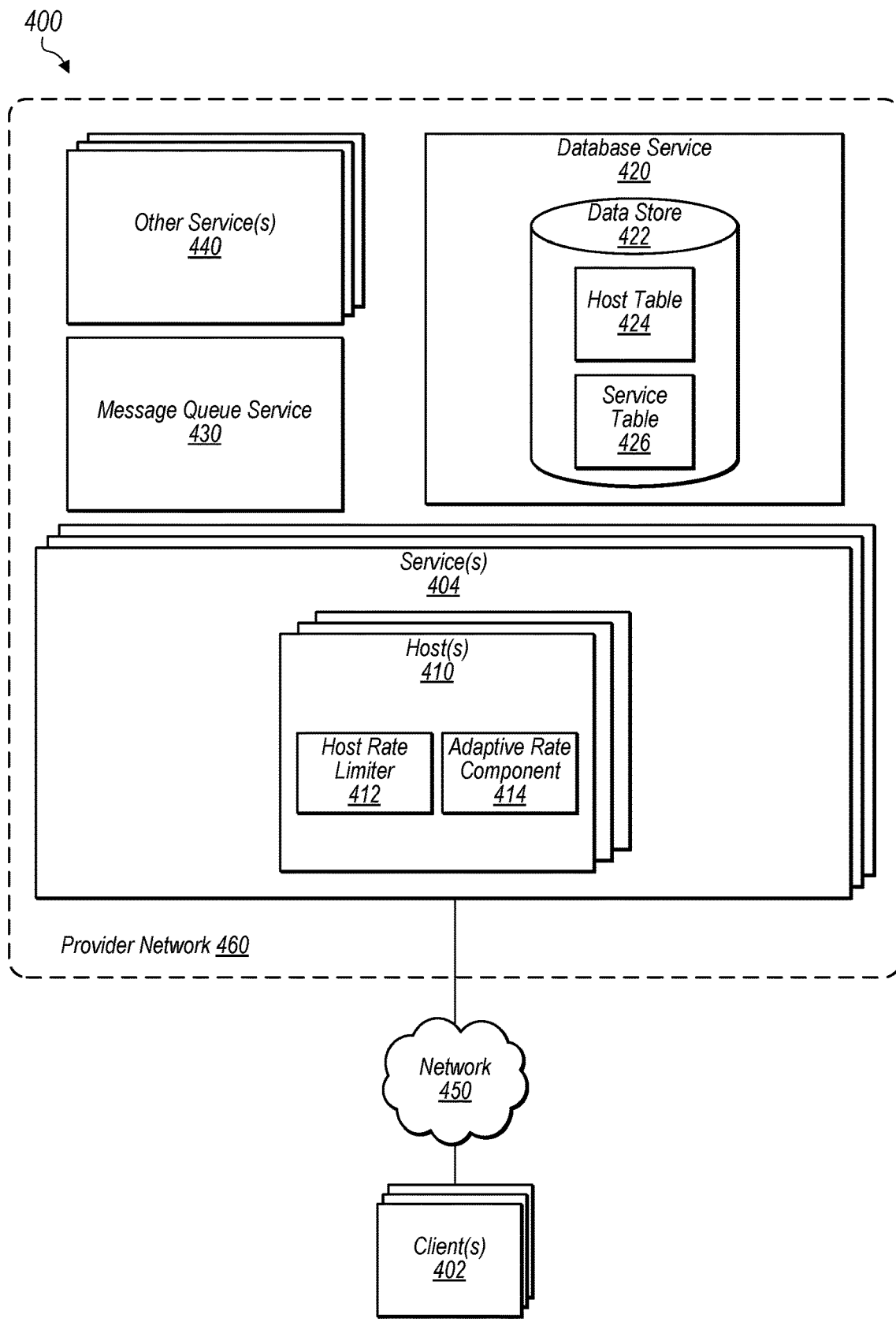
FIG. 4 illustrates a block diagram of a provider network environment 400 for adjusting host rate limits for a fleet of hosts implemented for one or more services, according to some embodiments.

FIG. 4 illustrates a block diagram of a provider network environment 400 for adjusting host rate limits for a fleet of hosts implemented for one or more services, according to some embodiments. The provider network environment 400 may include one or more clients 402 that communicate with a provider network 460 via a network 450.

The provider network environment 400 may include computing resources having respective hardware components configured to implement various services within the provider network environment, according to some embodiments. The provider network 460 may be configured to provide one or more services 404. The one or more services 404 may correspond to at least the service 104 of FIG. 1, according to some embodiments. The one or more services 404 may be implemented on or across one or more hosts 410. The one or more hosts 410 may correspond to the fleet of hosts 110 of FIG. 1.

The one or more hosts 410 may respectively include a host rate limiter 412 and an adaptive rate component 414, according to some embodiments. The host rate limiter 412 may correspond to the host rate limiter 116*a*, 116*b*, . . . 116*n* of FIG. 1. The adaptive rate component 414 may correspond to the adaptive rate component 111*a*, 111*b*, . . . 111*n* of FIG. 1. The host rate limiter 412 may be configured to limit a service rate of the one or more hosts 410 for interactions between one or more of a message queue service 430 or one or more other services 440. In some embodiments, the one or more hosts 410 may be configured to asynchronously retrieve messages according to a host rate limit applied by the host rate limiter 412 from the message queue service 430 to be processed as synchronous service calls to the one or more other services 440.

The adaptive rate component 414 may be configured to determine the host rate limit based on a fleet-wide service rate limit and a fleet host count, according to some embodiments. The fleet-wide service rate limit may indicate a limit of interactions between the one or more hosts 410, as a whole, with the message queue service 430 and/or the one or more other services 440. The fleet host count may indicate a quantity of the one or more hosts 410. In some embodiments, the adaptive rate component 414 may obtain information indicating the fleet-wide service rate limit and/or the fleet host count from a database service 410. The database service 410 may include a data store 422 configured to store a host table 424 and a service table 426. The host table 424 may store information relating to the one or more hosts 410 including heartbeat entries. The service table 426 may include information relating to various parameters including the fleet-wide service rate limit and the fleet host count.

In some embodiments, at least some aspects of the host rate limit adjustment techniques described herein may be implemented without acquiring resources of network-accessible services such as those shown in FIG. 4. For example, a standalone tool implemented at one or more computing devices which are not part of a network-accessible service may be used in one embodiment.

Figure 5:
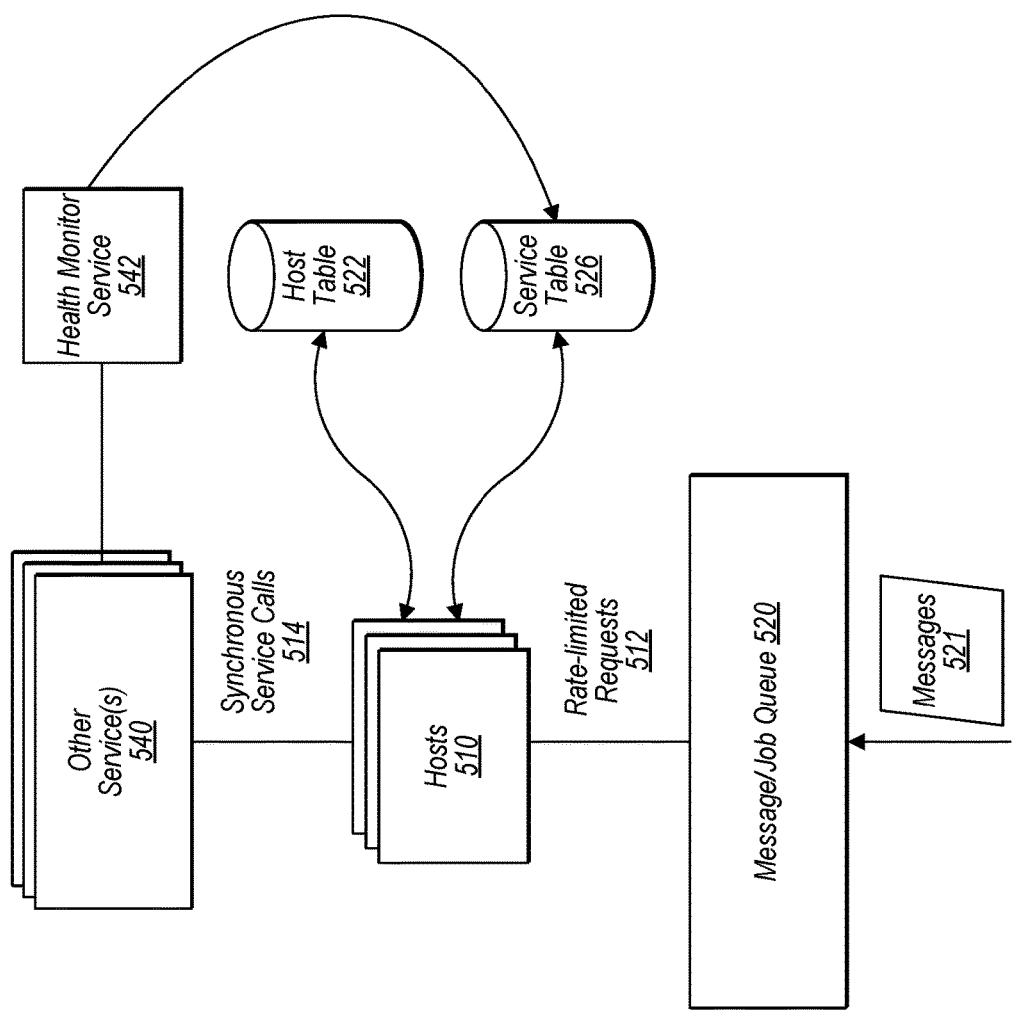
FIG. 5 illustrates a block diagram of one or more hosts processing messages from a message/job queue to issue service calls to one or more other services, according to some embodiments.

FIG. 5 illustrates a block diagram 500 of one or more hosts 510 processing messages from a message/job queue 520 to issue service calls to one or more other services 540, according to some embodiments.

The hosts 510 may establish communications with a host table 522 and a service table 526 to determine a host rate limit for individual hosts of the hosts 510, according to some embodiments. The hosts 510 may asynchronously send rate-limited requests 512 to retrieve messages 521 from the message/job queue 520 in accordance with the host rate limit, such as at a rate less than or equal to the host rate limit. The messages 521 may be pushed to the message/job queue 520 from another source, such as another service.

The hosts 510 may send synchronous service calls 514 or synchronous requests to the one or more other services 540 in order to fulfill the messages 521 received from the message/job queue 520, according to some embodiments. By applying the host rate limit to the rate-limited requests 512, the hosts 510 are able to protect the other services 540 from being overloaded by the synchronous service calls 514.

A health monitor service 542 may be configured to monitor the health status of the one or more other services 540. The health monitor service 542 may affect the fleet-wide service rate limit based on the work rate or workload applied to the one or more other services 540. The health monitor service 542 may modify the fleet-wide service rate by writing an updated fleet-wide service rate to the service table 526.

Figure 6:
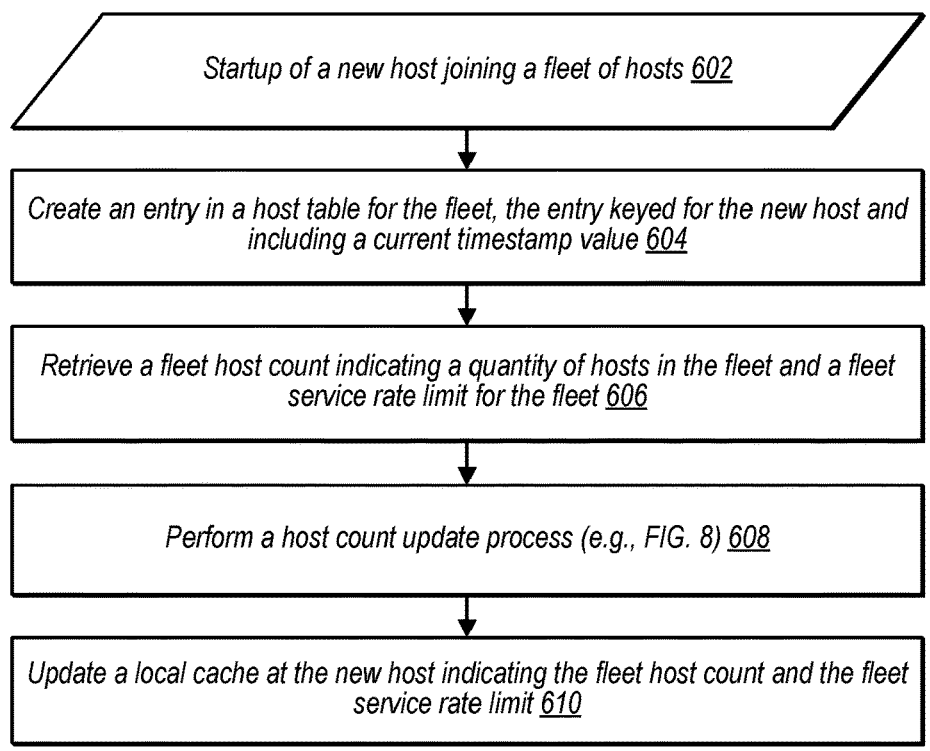
FIG. 6 is a flowchart diagram depicting a method for a new host joining a fleet of hosts to establish a fleet host count and a fleet service rate limit, according to some embodiments.

FIG. 6 is a flowchart diagram depicting a method 600 for a new host joining a fleet of hosts to establish a fleet host count and a fleet service rate limit, according to some embodiments. The method 600 may be performed by one or more computing resources implementing an adaptive rate component of a host, such as the adaptive rate components 111*a*, 111*b*, . . . 111*n* of FIG. 1, the adaptive rate component 414 of FIG. 4, or the hosts 510 of FIG. 5, according to various embodiments.

The method 600 may include receiving data indicating startup of a new host joining a fleet of hosts, at 602. The fleet of hosts may be configured to implement one or more functions for a service offered by a provider network, according to some embodiments. The new host may correspond to an individual host 110*a*, 110*b*, . . . 110*n* of FIG. 1, an individual host 302 of FIG. 3, an individual host 410 of FIG. 4, or an individual host 502 of FIG. 5. The fleet of hosts may correspond to the fleet of hosts 110 of FIG. 1, the one or more hosts 302 of FIG. 3, the one or more hosts 410 of FIG. 4, or the hosts 510, according to various embodiments.

The method 600 may also include creating an entry in a host table for the fleet, the entry keyed for the new host and including a current timestamp value, at 604. The host table may correspond to the host table 122 of FIG. 1, the host table 202 of FIG. 2, the host table 304 of FIG. 3, the host table 424 of FIG. 4, or the host table 522 of FIG. 5, according to various embodiments. The adaptive rate component may perform a heartbeat by establishing a connection to the host table to create a new entry on behalf of the new host. The new entry may include a host identifier that identifies the new host and a current timestamp.

The method 600 may also include retrieving a fleet host count indicating a quantity of hosts in the fleet and a service rate value for the fleet, at 606. In some embodiments, the fleet host count and the service rate value may be retrieved from a service table stored in a data store. The service table may correspond to the service table 126 of FIG. 1, the service table 210 of FIG. 2, the service table 306 of FIG. 3, the service table 426 of FIG. 4, or the service table 526 of FIG. 5, according to various embodiments. The adaptive rate component may be configured to query the service table in order to retrieve information relating to the service and the fleet of hosts performing the service.

The method 600 may further include performing a host count update process, at 608. One example host count update process is described in detail with respect to FIG. 8, according to some embodiments. The host count update process may result in the fleet host count being modified in the service table. In some embodiments, the host count update process may be performed by the adaptive rate component. In other embodiments, the host count update process may be performed by another service separate from the host.

The method 600 may conclude by updating a local cache at the new host indicating the fleet host count and the fleet service rate limit, at 110. The local cache may be a part of data 112*a*, 112*b*, . . . 112*n* of an individual host 110*a*, 110*b*, . . . 110*n*, of FIG. 1. The fleet host count and the fleet service rate limit may be stored to the local cache as a local copy in order to allow determination of the host rate limit based on a failure of retrieving the fleet service rate limit or the fleet host count from the data store, such as when a connection to the data store or the service table is severed.

Figure 7:
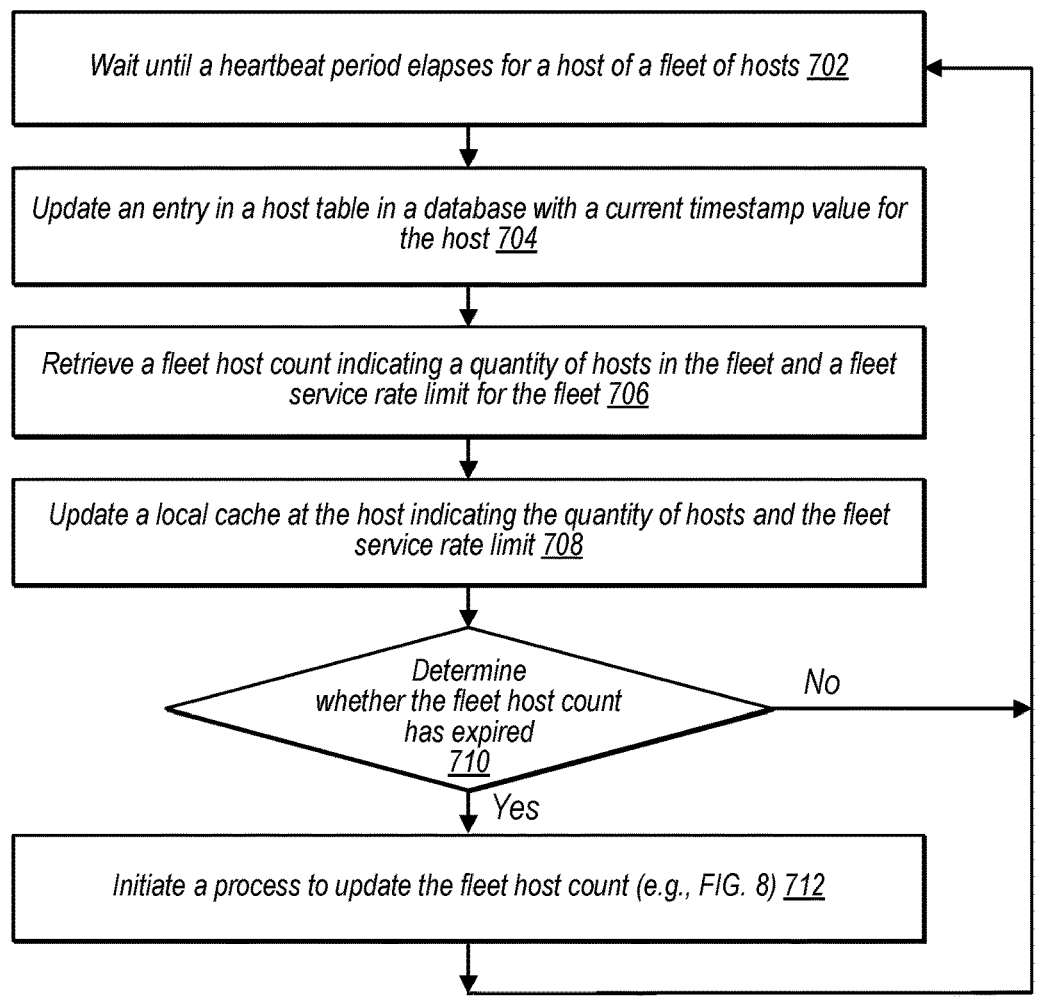
FIG. 7 is a flowchart diagram depicting a method for a host of a fleet of hosts periodically updating locally cached fleet host count and fleet service rate limit, according to some embodiments.

FIG. 7 is a flowchart diagram depicting a method 700 for a host of a fleet of hosts periodically updating locally cached fleet host count and fleet service rate limit, according to some embodiments. The method 700 may be performed by one or more computing resources implementing an adaptive rate component of a host, such as the adaptive rate components 111a, 111b, . . . 111n of FIG. 1, the adaptive rate component 414 of FIG. 4, or the hosts 510 of FIG. 5, according to various embodiments.

The method 700 includes waiting until a heartbeat period elapses for a host of a fleet of hosts, at 702. The fleet of hosts may be configured to implement one or more functions for a service offered by a provider network, according to some embodiments. The host may correspond to an individual host 110a, 110b, . . . 110n of FIG. 1, an individual host 302 of FIG. 3, an individual host 410 of FIG. 4, or an individual host 502 of FIG. 5. The fleet of hosts may correspond to the fleet of hosts 110 of FIG. 1, the one or more hosts 302 of FIG. 3, the one or more hosts 410 of FIG. 4, or the hosts 510, according to various embodiments.

The method 700 also includes updating an entry in a host table in a database with a current timestamp value for the host, at 704. The host table may correspond to the host table 122 of FIG. 1, the host table 202 of FIG. 2, the host table 304 of FIG. 3, the host table 424 of FIG. 4, or the host table 522 of FIG. 5, according to various embodiments. The adaptive rate component may perform a heartbeat by establishing a connection to the host table to update an entry on behalf of the host. The entry may include a host identifier that identifies the new host and a current timestamp.

The method 700 also includes retrieving a fleet host count indicating a quantity of hosts in the fleet and a fleet service rate limit for the fleet, at 706. In some embodiments, the fleet host count and the service rate value may be retrieved from a service table stored in a data store. The service table may correspond to the service table 126 of FIG. 1, the service table 210 of FIG. 2, the service table 306 of FIG. 3, the service table 426 of FIG. 4, or the service table 526 of FIG. 5, according to various embodiments. The adaptive rate component may be configured to query the service table in order to retrieve information relating to the service and the fleet of hosts performing the service.

The method 700 further includes updating a local cache at the host indicating the quantity of hosts and the fleet service rate limit, at 708. The local cache may be a part of data 112a, 112b, . . . 112n of an individual host 110a, 110b, . . . 110n, of FIG. 1. The fleet host count and the fleet service rate limit may be stored to the local cache as a local copy in order to allow determination of the host rate limit in response to failure of retrieving the fleet service rate limit or the fleet host count from the data store, such as when a connection to the data store or the service table is severed.

The method 700 also includes determining whether the fleet host count has expired, at 710. In some embodiments, the service table may indicate a last host count update timestamp that indicates a last time when the fleet host count was updated at the service table. Based on the last host count update timestamp, the adaptive rate component may determine that the fleet host count is expired.

Based on a determination that the fleet host count has expired, the method 700 further includes initiating a process to update the fleet host count, at 712. One example host count update process is described in detail with respect to FIG. 8, according to some embodiments. The host count update process may result in the fleet host count being modified in the service table. In some embodiments, the host count update process may be performed by the adaptive rate component. In other embodiments, the host count update process may be performed by another service separate from the host.

Based on a determination that the fleet host count has not expired or after the process to update the fleet host count, the method 700 may return to 702 to wait until the heartbeat period elapses for the host.

Figure 8:
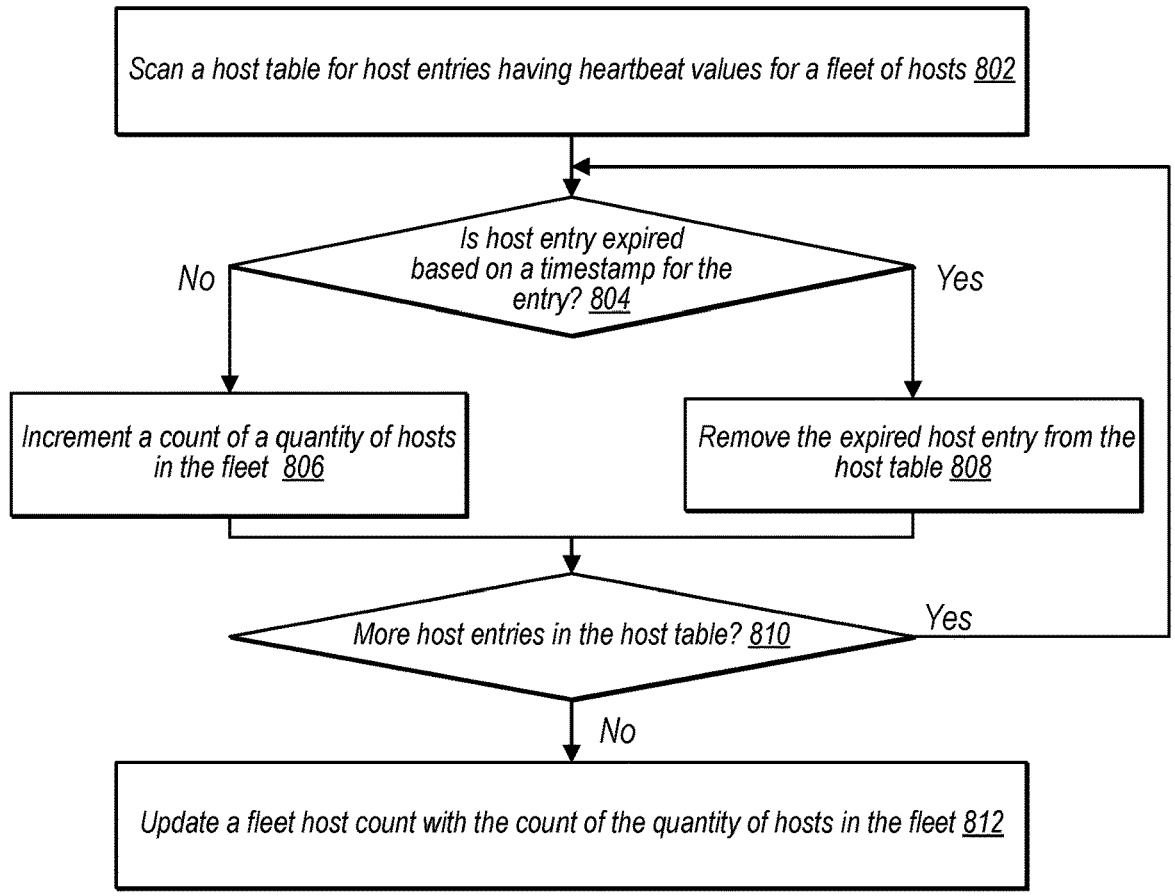
FIG. 8 is a flowchart diagram depicting a method for updating a fleet host count based on a host table having heartbeat values for a fleet of hosts, according to some embodiments.

FIG. 8 is a flowchart diagram depicting a method 800 for updating a fleet host count based on a host table having heartbeat values for a fleet of hosts, according to some embodiments. In some embodiments, the method 800 may be implemented by one or more computing resources implementing an adaptive rate component of a host, such as the adaptive rate components 111a, 111b, . . . 111n of FIG. 1, the adaptive rate component 414 of FIG. 4, or the hosts 510 of FIG. 5, according to various embodiments. In other embodiments, the method 800 may be implemented by another process configured to manage the fleet host count separate from other hosts.

The method 800 includes scanning a host table for host entries having heartbeat values for a fleet of hosts, at 802. The host table may correspond to the host table 122 of FIG. 1, the host table 202 of FIG. 2, the host table 304 of FIG. 3, the host table 424 of FIG. 4, or the host table 522 of FIG. 5, according to various embodiments. The heartbeat values may include timestamps indicating reference times which the various hosts have performed heartbeat operations with the host table. In some embodiments, scanning the host table may include iteratively traversing the host entries of the host table.

The method 800 also includes determining whether a host entry is expired based on a timestamp for the entry, at 804. In some embodiments, a configuration parameter may indicate a period of time to add to the timestamp to determine whether the timestamp is indicative of an expired host entry. The host delete corresponding records for the expired hosts from the host table in order to reduce subsequent processing times for subsequent queries of the database.

Based on a determination that the host entry is not expired, the method 800 further includes incrementing a count of a quantity of hosts in the fleet, at 806. The count of the quantity of hosts may be incremented for each host entry that has not expired.

Based on a determination that the host entry has expired, the method 800 further includes removing the expired host entry from the host table, at 808. The host may be configured to delete the expired host entry from the host table such that the host entry is no longer to be counted in the fleet host count. Deletion of the host entry may have the effect of removing the expired host from the fleet of hosts.

The method 800 also includes determining whether there are more host entries in the host table, at 810. Based on a determination that there are more host entries in the host table, the method 800 may return to return to 804 to scan additional host entries.

Based on a determination that there are no more host entries in the host table, the method 800 concludes by updating a fleet host count with the count of the quantity of hosts in the fleet, at 812. The fleet host count may reflect the count of the quantity of hosts and stored to a service table for subsequent lookup by other hosts.

Figure 9:
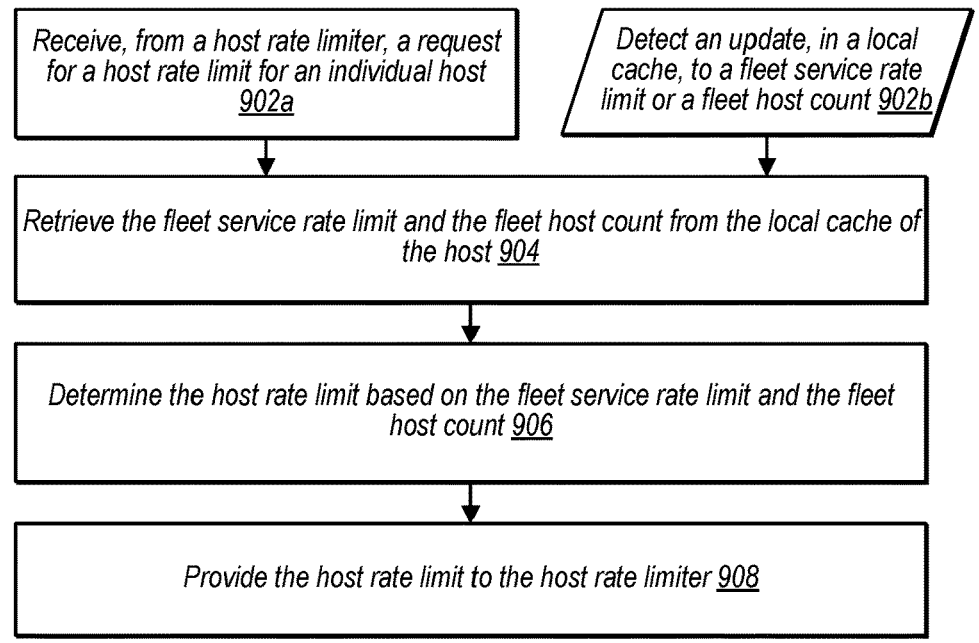
FIG. 9 illustrates a flowchart diagram depicting a method for determining a host rate limit in response to one or more triggering conditions, according to some embodiments.

FIG. 9 illustrates a flowchart diagram depicting a method 900 for determining a host rate limit in response to one or more triggering conditions, according to some embodiments. The method 600 may be performed by one or more computing resources implementing an adaptive rate component of a host, such as the adaptive rate components 111a, 111b, . . . 111n of FIG. 1, the adaptive rate component 414 of FIG. 4, or the hosts 510 of FIG. 5, according to various embodiments.

The method 900 may be initiated by one or more trigger conditions, such as 902a and 902b. One or both of 902a or 902b may occur in order to proceed further in the method 900, according to some embodiments.

The method 900 may include receiving, from a host rate limiter, a request for a host rate limit, at 902a. The host rate limiter may correspond to the host rate limiter 116a, 116b, . . . 116n of FIG. 1 or the host rate limiter 412 of FIG. 4, according to some embodiments. The host rate limiter may be configured to request the host rate limit periodically or occasionally in order to ensure that the host rate limit is as accurate as possible within certain timing thresholds.

The method 900 may alternatively include detecting an update, in a local cache, to a fleet service rate limit or a fleet host count, at 902b. The local cache may be stored as part of data 112a, 112b, . . . 112n of FIG. 1, according to some embodiments. The fleet service rate limit may correspond to fleet service rate limit 114a, 114b, . . . 114n of FIG. 1. The fleet host count may correspond to fleet host count 113a, 113b, . . . 113n of FIG. 1. The adaptive rate component may receive an indication that the local cache has been updated for at least one of the fleet service rate limit or the fleet host count.

The method 900 may include retrieving the fleet service rate limit and the fleet host count from the local cache of the host, at 904. The local cache may provide the fleet service rate limit and the fleet host count to the adaptive rate component without having to access an external data store.

The method 900 may include determining the host rate limit based on the fleet service rate limit and the fleet host count, at 906. In some embodiments, the host rate limit may be determined based on the fleet service rate limit divided by the fleet host count. In other embodiments, the host rate limit may be determined based on weighting the fleet host count depending on host configurations or demands. Other embodiments may include determining the host rate limit based on other calculation methods.

The method 900 concludes by providing the host rate limit to the host rate limiter, at 908. The adaptive rate component may transmit information indicating the host rate limit to the host rate limiter. The host rate limiter may apply the host rate limit to interactions between the host and other services.

Figure 10:
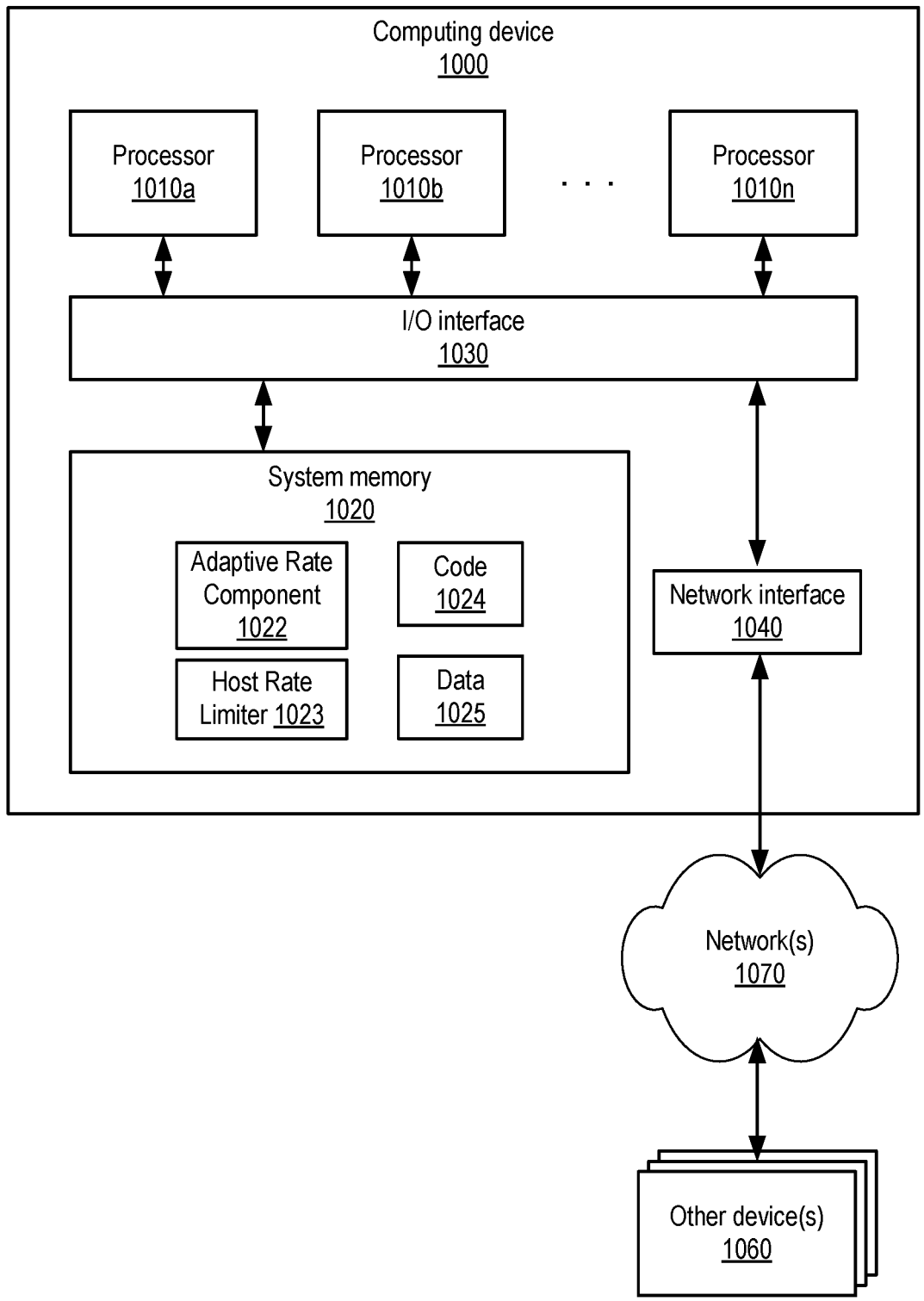
FIG. 10 is a block diagram illustrating an example computer system that may be used in some embodiments.

Any of various computer systems may be configured to implement techniques for managing memory compression in a secure manner, as disclosed herein. For example, FIG. 10 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 1000 such as that illustrated in FIG. 10 or one or more components of the computer system 1000 that function in a same or similar way as described for the computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable application, while in other embodiments servers may include more, fewer, or different elements than computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions on or across the processors 1010. For example, in various embodiments, processors 1010 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 1020 as program instructions 1024. In some embodiments, system memory 1020 may include data 1025 which may be configured as described herein. In some embodiments, system memory 1020 may include an adaptive rate component 1022. For example, adaptive rate component 1022 may perform the functions of adaptive rate components 111a, 111b, . . . 111n of the fleet of hosts 110 of FIG. 1. In some embodiments, system memory 1020 may include host rate limiter 1023. For example, host rate limiter 1023 may perform the functions of host rate limiter 116a, 116b, . . . 116n of FIG. 1.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as between client devices (e.g., 1060, etc.) and other computer systems, or among hosts, for example. In particular, network interface 1040 may be configured to allow communication between computer system 1000 and/or various other devices 1060 (e.g., I/O devices). Other devices 1060 may include scanning devices, display devices, input devices and/or other communication devices, as described herein. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks 1070, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, which may be implemented via network interface 1040.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 1000, including one or more processors 1010 and various other devices (though in some embodiments, a computer system 1000 implementing an I/O device 1050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1000. In general, an I/O device (e.g., cursor control device, keyboard, or display(s) may be any device that can communicate with elements of computing system 1000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a plurality of computing devices comprising respective processors and memories configured to implement a fleet of hosts for a service;
wherein individual hosts of the fleet of hosts respectively comprise:
application logic implemented by one or more of the respective processors and memories of the individual host;
a host rate limiter implemented by the one or more respective processors and memories of the individual host, the host rate limiter configured to limit interactions between the application logic and another service according to a host rate limit for the individual host; and
an adaptive rate component implemented by the respective one or more processors and memories of the individual host, the adaptive rate component configured to:
update a host entry in a host table to indicate a current heartbeat timestamp for the individual host;
retrieve, from a data store, a fleet-wide service rate value for the fleet of hosts and a fleet host count value, wherein the fleet-wide service rate value indicates a fleet service rate limit for interactions between the fleet of hosts as a whole and the other service, and wherein the fleet host count value indicates a current count of active hosts in the fleet of hosts determined based on host entries for the fleet of hosts in the host table;
determine the host rate limit for the individual host based on the fleet-wide service rate value and the fleet host count value; and
provide the host rate limit for the individual host to the host rate limiter.

2. The system of claim 1, wherein the adaptive rate component is further configured to:
determine whether the retrieved host count value has expired based on a last update timestamp for the host count value; and based on a determination that the retrieved host count record has expired, perform a host count value update process.

3. The system of claim 2, wherein to perform the host count value update process the adaptive rate component is further configured to:
scan the host table to determine the current count of active hosts according to host entries of the host table having unexpired heartbeat timestamps.

4. The system of claim 1, wherein the adaptive rate component is further configured to:
repeat said update, said retrieve, and said determine at a heartbeat time interval.

5. The system of claim 4, the adaptive rate component is further configured to:
store a local copy of the fleet-wide service rate value and the host count value; and
in response to a failure to retrieve the fleet-wide service rate value or the host count value from the data store, determine the host rate limit based on the local copy of the fleet-wide service rate value or the host count value.

6. A method, comprising:
performing, by individual hosts of a fleet of hosts for a first service:
updating, in a host table, a host entry to indicate a current heartbeat timestamp for the host;
retrieving, from a data store, a fleet-wide service rate value for the fleet and a host count value, wherein the fleet-wide service rate value indicates a service rate limit for interactions between the fleet as a whole and a second service, and wherein the host count value indicates a current count of active hosts in the fleet based on host entries in the host table for the fleet;
determining an individual host rate limit for the host based on the retrieved fleet-wide service rate value and the retrieved host count value, wherein the individual host rate limit indicates a host rate limit for interactions between the host and the second service; and
providing the individual host rate limit to a host rate limiter implemented by the host, wherein the host rate limiter is configured to limit the interactions between the host and second service according to the individual host rate limit.

7. The method of claim 6, further comprising:
determining whether the retrieved host count value has expired based on a last update timestamp for the host count value; and
based on a determination that the retrieved host count value has expired, performing a host count value update process.

8. The method of claim 7, wherein performing the host count value update process comprises:
scanning the host table to determine the quantity of hosts according to host entries of the host table having unexpired heartbeat timestamps.

9. The method of claim 8, wherein performing the host count value update process comprises:
determining expired host entries of the host entries of the host table according to respective heartbeat timestamps in the host table and an expiration time parameter for the fleet; and
removing the expired data entries from the host table.

10. The method of claim 6, further comprising:
repeating said updating, said retrieving, and said determining at a heartbeat time interval.

11. The method of claim 6, further comprising:
storing a local copy of the retrieved fleet-wide service rate and the retrieved host count value; and
receiving, from a host rate limiter, a request to update the individual host rate limit, wherein said determining and said providing are performed responsive to the request from the host rate limiter, and said determining is based on the local copy of the retrieved fleet-wide service rate and the retrieved host count value.

12. The method of claim 6, further comprising:
storing a local copy of the fleet-wide service rate and the host count value; and
in response to a failure of retrieving the fleet-wide service rate value or the host count value from the data store, determining the individual host rate limit based on the local copy of the fleet-wide service rate value or the host count value.

13. The method of claim 6, wherein the second service comprises a message queue, the method further comprising:
sending requests by the host to the message queue to retrieve messages from the message queue at a rate less than or equal to the individual host rate limit; and
based on processing the messages, sending synchronous requests to a third service.

14. One or more non-transitory computer-readable storage media storing instructions that, when executed on or across one or more processors, cause the one or more processors to implement an adaptive rate component on individual hosts of a fleet of hosts for a service, the adaptive rate component configured to:
update, in a host table, a host entry to indicate a current heartbeat timestamp for the host of the fleet of hosts for the service;
retrieve, from a data store, a fleet-wide service rate value for the fleet and a host count value, wherein the fleet-wide service rate value indicates a service rate limit for interactions between the fleet as a whole and another service, wherein the host count value indicates a current count of active hosts in the fleet based on host entries in the host table for the fleet;
determine an individual host rate limit for the host based on the retrieved fleet-wide service rate value and the retrieved host count value, wherein the individual host service rate value indicates a host rate limit for interactions between the host and the other service; and
provide the individual host rate limit to a host rate limiter implemented by the host, wherein the host rate limiter is configured to limit the interactions between the host and second service according to the individual host rate limit.

15. The non-transitory computer-readable storage media of claim 14, further comprising instructions that, when executed on or across the one or more processors, cause the one or more processors to:
determine whether the retrieved host count value has expired based on a last update timestamp for the host count value; and
based on a determination that the retrieved host count value has expired, perform a host count value update process.

16. The non-transitory computer-readable storage media of claim 15, further comprising instructions that, when executed on or across the one or more processors, cause the one or more processors to:
scan the host table to determine the quantity of hosts according to host entries of the host table having unexpired heartbeat timestamps.

17. The non-transitory computer-readable storage media of claim 16, further comprising instructions that, when executed on or across the one or more processors, cause the one or more processors to:
- determine expired host entries of the host entries of the host table according to respective heartbeat timestamps in the host table and an expiration time parameter for the fleet; and
- remove the expired data entries from the host table.

18. The non-transitory computer-readable storage media of claim 14, further comprising instructions that, when executed on or across the one or more processors, cause the one or more processors to:
- repeat said update, said retrieve, and said determine at a heartbeat time interval.

19. The non-transitory computer-readable storage media of claim 14, further comprising instructions that, when executed on or across the one or more processors, cause the one or more processors to:
- store a local copy of the retrieved fleet-wide service rate and the retrieved host count value,
- wherein said determining and said providing are performed responsive to a request from a host rate limiter, and said determining is based on the local copy of the retrieved fleet-wide service rate and the retrieved host count value.

20. The non-transitory computer-readable storage media of claim 14, further comprising instructions that, when executed on or across the one or more processors, cause the one or more processors to:
- store a local copy of the fleet-wide service rate and the host count value; and
- in response to a failure of retrieving the fleet-wide service rate value or the host count value from the data store, determine the individual host rate limit based on the local copy of the fleet-wide service rate value or the host count value.

* * * * *